(12) United States Patent
Delahunt et al.

(10) Patent No.: US 11,411,842 B1
(45) Date of Patent: Aug. 9, 2022

(54) METHOD AND APPARATUS FOR PROVIDING TARGETED SERVICES

(71) Applicant: Cujo LLC, Walnut, CA (US)

(72) Inventors: Barry Delahunt, Espoo (FI); Gabor Takacs, Budapest (HU)

(73) Assignee: CUJO LLC, Walnut, CA (US)

( * ) Notice: Subject to any disclaimer, the term of this patent is extended or adjusted under 35 U.S.C. 154(b) by 0 days.

(21) Appl. No.: 17/335,204

(22) Filed: Jun. 1, 2021

(51) Int. Cl.
| H04L 41/5061 | (2022.01) |
| H04L 41/12 | (2022.01) |
| H04L 41/16 | (2022.01) |
| H04L 43/045 | (2022.01) |
| H04L 41/0893 | (2022.01) |
| H04L 43/062 | (2022.01) |

(52) U.S. Cl.
CPC ...... *H04L 41/5061* (2013.01); *H04L 41/0893* (2013.01); *H04L 41/12* (2013.01); *H04L 41/16* (2013.01); *H04L 43/045* (2013.01); *H04L 43/062* (2013.01)

(58) Field of Classification Search
CPC ............. H04N 21/812; H04N 21/2668; H04N 21/25883; H04N 21/4667; H04N 21/44222; H04N 21/4532; G06Q 30/0269; G06Q 30/0251; G06Q 30/0201; G06Q 30/0246; G06Q 30/0277; G06Q 30/0244; G06Q 30/0271; G06N 20/00; G06N 7/005; H04H 60/66
See application file for complete search history.

(56) References Cited

U.S. PATENT DOCUMENTS

| 8,195,703 B1 * | 6/2012 | Whistler ............... G06F 16/284 |
| | | 707/796 |
| 10,861,053 B1 * | 12/2020 | Feininger ........... G06Q 30/0269 |
| 2008/0184289 A1 * | 7/2008 | Cristofalo .............. G06Q 30/02 |
| | | 725/34 |

(Continued)

OTHER PUBLICATIONS

Pulkit Sharma, "The Most Comprehensive Guide to K-Means Clustering You'll Ever Need", Aug. 19, 2019, Retrieved online on Sep. 22, 2021 from https://www.analyticsvidhya.com/blog/2019/08/comprehensive-guide-k-means-clustering/ (Year: 2019).*

(Continued)

*Primary Examiner* — Dhairya A Patel
*Assistant Examiner* — Sandarva Khanal
(74) *Attorney, Agent, or Firm* — Dority & Manning, P.A.

(57) ABSTRACT

A method includes receiving network traffic data relating to one or more devices of a plurality of home networks, wherein each home network of the plurality of home networks relates to a respective household. The method further includes determining one or more household related features by feature engineering the network traffic data, wherein the one or more household related features are related to one or more of: a device property, a security threat event, and an application usage, associating, in a database, the one or more household related features with identification data assigned to each household, identifying household clusters that represent groups of households comprising a predetermined number of common household related features, and providing a targeted service to a customer based on a household cluster associated with a household of the customer.

14 Claims, 4 Drawing Sheets

200 RECEIVE NETWORK TRAFFIC DATA RELATING TO ONE OR MORE DEVICES OF A PLURALITY OF HOME NETWORKS, WHEREIN EACH HOME NETWORK RELATES TO A RESPECTIVE HOUSEHOLD

201 DETERMINE ONE OR MORE HOUSEHOLD RELATED FEATURES BY FEATURE ENGINEERING THE NETWORK TRAFFIC DATA, WHEREIN THE HOUSEHOLD RELATED FEATURES ARE RELATED TO ONE OR MORE OF: A DEVICE PROPERTY, A SECURITY THREAT EVENT AND APPLICATION USAGE

202 ASSOCIATE, IN A DATABASE, THE ONE OR MORE HOUSEHOLD RELATED FEATURES WITH IDENTIFICATION DATA ASSIGNED TO EACH HOUSEHOLD

203 IDENTIFY HOUSEHOLD CLUSTERS THAT REPRESENT GROUPS OF HOUSEHOLDS COMPRISING A PREDETERMINED NUMBER OF COMMON HOUSEHOLD RELATED FEATURES

204 PROVIDE A TARGETED SERVICE TO A CUSTOMER BASED ON THE HOUSEHOLD CLUSTER ASSOCIATED WITH THE HOUSEHOLD OF THE CUSTOMER

(56) References Cited

U.S. PATENT DOCUMENTS

| | | | | |
|---|---|---|---|---|
| 2009/0276377 | A1* | 11/2009 | Dutta | G06Q 30/02 706/12 |
| 2010/0037255 | A1* | 2/2010 | Sheehan | H04N 21/252 725/34 |
| 2013/0054166 | A1* | 2/2013 | Suzuki | G06Q 50/06 702/62 |
| 2014/0188565 | A1* | 7/2014 | Dantressangle | G06Q 50/06 705/7.33 |
| 2014/0358839 | A1* | 12/2014 | Dhurandhar | G01D 4/00 706/48 |
| 2015/0072735 | A1* | 3/2015 | Hughes | H04W 88/06 455/558 |
| 2017/0034591 | A1* | 2/2017 | Ray | G06Q 30/0269 |
| 2017/0134232 | A1* | 5/2017 | Palanciuc | H04L 41/0816 |
| 2017/0149812 | A1* | 5/2017 | Alton | G06N 7/005 |
| 2018/0285788 | A1* | 10/2018 | Andrei | G06F 16/287 |
| 2019/0026355 | A1* | 1/2019 | Yano | G06F 16/904 |
| 2021/0099489 | A1* | 4/2021 | Ivanov | H04L 63/1441 |
| 2021/0160253 | A1* | 5/2021 | Lee | H04L 67/1044 |

OTHER PUBLICATIONS

Luo et al., "You Are What You Watch and When You Watch: Inferring Household Structures From IPTV Viewing Data", IEEE transactions on broadcasting, vol. 60, No. 1, Mar. 2014. (Year: 2014).*

NPL to Leng et al., 'Topic Model Based Behaviour Modeling and Clustering Analysis for Wireless Network Users', Nov. 17, 2015 (Year : 2015).*

NPL to Lin, 'Identifying and Segmenting Commuting Behavior Patterns Based on Smart Card Data and Travle Survey Data', Jun. 19, 2020 (Year: 2020).*

NPL to Wang, 'User online behavior based on big data distributed clustering algorithm', International Journal of Advanced Robotic Systems, Mar.-Apr. 2020: 1-10. DOI: 10.1177/1729881420917293 (Year: 2020).*

* cited by examiner

METHOD AND APPARATUS FOR PROVIDING TARGETED SERVICES

TECHNICAL FIELD

The present application relates generally network traffic analysis. Specifically, it relates to providing targeted services based on network traffic data analysis.

BACKGROUND

It can be desirable to have reliable solutions for enabling targeted services to customers based on network traffic data.

SUMMARY

According to an aspect of the invention there is provided a method.

According to other aspect of the invention, there is provided a computer network system.

According to other aspect of the invention, there is provided a non-transitory computer-readable medium comprising stored program code, the program code comprised of computer-executable instructions that, when executed by a processor, causes the processor to operate.

Those skilled in the art will appreciate the scope of the disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

The embodiments set forth below represent the information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for the purposes of illustration, but unless otherwise explicitly indicated, the embodiments are not limited to any particular sequence of steps. The use herein of ordinals in conjunction with an element is solely for distinguishing what might otherwise be similar or identical labels, such as "first message" and "second message", and does not imply a priority, a type, an importance, or other attribute, unless otherwise stated herein.

As used herein and in the claims, the articles "a" and "an" in reference to an element refers to "one or more" of the elements unless otherwise explicitly specified. The word "or" as used herein and in the claims is inclusive unless contextually impossible. As an example, the recitation of A or B means A, or B, or both A and B.

The figures and the following description relate to the example embodiments by way of illustration only. Alternative embodiments of the structures and methods disclosed herein will be readily recognized as viable alternatives that may be employed without departing from the principles of what is claimed.

Figure 1:
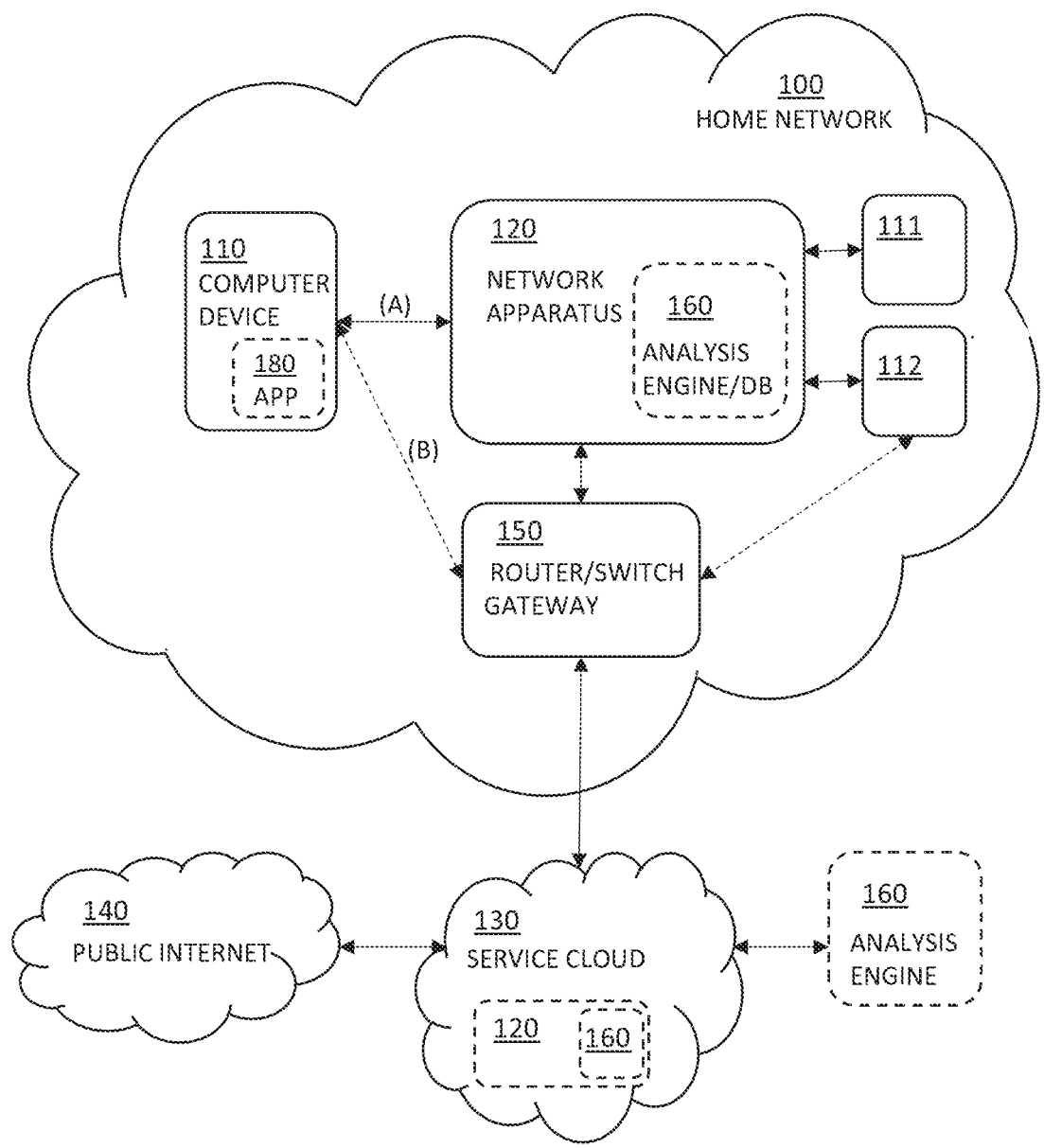
FIG. 1 illustrates an example system environment for a network apparatus in a computer network system.

FIG. 1 illustrates schematically an example of a system environment for a network apparatus 120. The system environment illustrated in FIG. 1 includes a computer network 100, such as a local or a home network, that may include one or more computer devices 110, 111, 112, the network apparatus 120, a local router/switch 150, and an analysis engine and a database 160. The computer devices 110, 111, 112 may also comprise any number of client applications 180. The example system also includes a service cloud 130, such as a network operator's cloud and the Internet 140. The analysis engine/database 160 may reside in the computer network, in the service cloud 130 or elsewhere in the network. There may also be more than one analysis engines 160 thus enabling at least part of the analysis being processed in more than one analysis engines. Alternative embodiments may include more, fewer, or different components from those illustrated in FIG. 1, and the functionality of each component may be divided between the components differently from the description below. Additionally, each component may perform their respective functionalities in response to a request from a human, or automatically without human intervention.

In an embodiment, the devices 110, 111, 112 may communicate (A) via the network apparatus 120 residing in the computer network 100. In another embodiment, the device 110, 111, 112 may communicate (B) directly via a network gateway or a modem 150, for example when the device is not in the computer network 100. In an embodiment, the network operators may deploy a service platform on their broadband gateways 150 provided to customers and in their own cloud environments 130. The user device(s) 110, 111, 112 may also be configured to use the services provided by the service cloud 130 by one or more applications/operating systems 180 installed on the device(s) 110, 111, 112.

The device 110, 111, 112 may be any computer device, such a smart device, a smart appliance, a smart phone, a laptop, or a tablet having a network interface and an ability to connect to the network apparatus 120 and/or the local network router 150 with it. The network apparatus 120 collects information, e.g., about the computer network 100, including data about the network traffic through the computer network 100 and data identifying devices in the computer network 100, such as any smart appliances and user devices 110, 111, 112. The network apparatus 120 is configured to receive traffic control instructions from the analysis engine 160 and to process network traffic based on the traffic control instructions. Processing the network traffic through the computer network 100, for example, can include enforcing network or communication policies on devices, restricting where network traffic can travel, blocking network traffic from entering the computer network 100, redirecting a copy of network traffic packet or features of those packets to the analysis engine 160 for analysis (e.g., for malicious behavior), or quarantining the network traffic to be reviewed by a user (e.g., via the user device 110) or network administrator. In some embodiments, the functionality of the network apparatus 120 is performed by a device that is a part of the computer network 100, while in other embodiments, the functionality of the network apparatus 120 is performed by a device outside of the computer network 100.

The network apparatus 120 may be configured to monitor traffic that travels through the computer network 100. In some embodiments, the network apparatus 120 can be a device that is a part of the computer network 100. The network apparatus 120 can be connected to the computer network 100 using a wired connection (e.g., via an Ethernet cable connected to a router) or using a wireless connection (e.g., via a Wi-Fi connection). In some embodiments, the network apparatus 120 can comprise multiple devices. In some embodiments, the network apparatus 120 can also perform the functions of the local network router 150 for the computer network 100.

In some embodiments, the network apparatus 120 may intercept traffic in the computer network 100 by signaling to the user device 110, 111, 112 that the network apparatus 120 is a router 150. In some embodiments, the network apparatus 120 replaces the default gateway or gateway address of the computer network 100 with its own Internet protocol address. In some embodiments, the computer network 100 can be structured such that all network traffic passes through the network apparatus 120, allowing the network apparatus 120 to physically intercept the network traffic. For example, the network apparatus 120 can serve as a bridge through which all network traffic must travel to reach the router 150 of the computer network 100.

The analysis engine 160 may receive and analyze network traffic data (e.g., forwarded by the network apparatus 120) associated with devices on the computer network. The analysis engine 160 may be implemented within a remote system (e.g., a cloud server) or within the computer network 100. The analysis engine 160 may perform operations that are computationally expensive for the network apparatus 120 to perform. In some embodiments, the analysis engine 160 replaces the network apparatus 120 by performing the functionalities of the network apparatus 120. In these embodiments, the computer network router 150 may be configured to forward network traffic to the analysis engine 160. In some embodiments, the analysis engine 160 communicates with other devices on the computer network. In some embodiments, the analysis engine 160 is integrated into the network apparatus 120.

The computer network 100 may be a local area network (LAN) that comprises the one or more devices 110, 111, 112, network apparatus 120, and local network router 150. The computer network 100 may be used for a number of purposes, including a home network or a network used by a business. The computer network 100 is connected to the Internet or other Inter-autonomous network infrastructure 140, allowing devices within the computer network 100, including the user device 110, 111, 112 to communicate with devices outside of the computer network 100. The computer network 100 may be a private network that may require devices to present credentials to join the network, or it may be a public network allowing any device to join. In some embodiments, other devices, like personal computers, smartphones, or tablets, may join computer network 100.

The internet 140 and the computer network 100 may comprise any combination of LANs and wide area networks (WANs), using both wired and wireless communication systems. In some embodiments, the internet 140 and the computer network 100 use standard communications technologies and protocols. Data exchanged over the internet 140 and the computer network 100 may be represented using any suitable format, such as hypertext markup language (HTML) or extensible markup language (XML) or any other presentation or application layer format suitable for transporting data over a network. In some embodiments, all or some of the communication links of the internet 140 and the computer network 100 may be encrypted using any suitable technique or techniques.

The computer device 110, 111, 112 may be a computing device capable of receiving user input as well as transmitting and/or receiving data via the Internet 140 or computer network 100. In some embodiments, the device 110, 111, 112 is a conventional computer system, such as a desktop or a laptop computer. Alternatively, the device 110, 111, 112 may be a device having computer functionality, such as a personal digital assistant (PDA), a mobile telephone, a smartphone, or another suitable device. The device 110, 111, 112 is a network device configured to communicate with the Internet 140 or computer network 100. In some embodiments, the device 110, 111, 112 executes an application (e.g., application 180) allowing a user of the user device 110, 111, 112 to interact with other network devices, such as the smart appliances, the network apparatus 120, the router 150, or the analysis engine 160. For example, the device 110, 111, 112 executes a browser application to enable interaction between the device 110 and the network apparatus 120 via the computer network 100.

The client application 180 is a computer program or software application configured to run on the user device 110. For example, the application 180 is a web browser, a mobile game, an email client, or a mapping program. The device 110 can have any number of applications 180 installed. The application 180 may communicate, via the user device 110, with devices inside and outside of the computer network 100.

The computer network 100 can also be a small office and/or a domestic/home network that comprises several Internet of Things (IoT) and smart devices as well as portable computers and tablet computers, for example. One or more of these devices are connected to the Internet 140, for example, via one or more Wi-Fi access points.

Embodiments of the present invention overcome the drawbacks of the previous solutions by applying new capabilities and methods targeted to enabling providing targeted services to customers based on network traffic data analysis.

Figure 2:
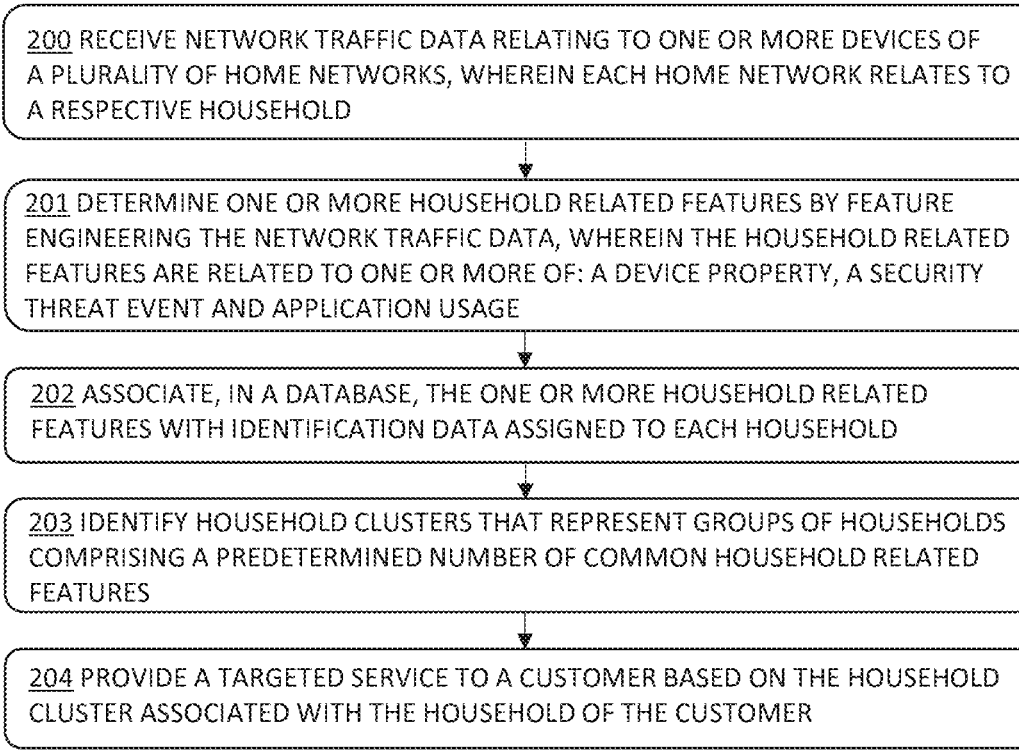
FIG. 2 is a flow diagram illustrating an example method, according to one embodiment.

FIG. 2 is a flow diagram illustrating an embodiment of a method.

In 200, network traffic data relating to one or more devices of a plurality of home networks is received, wherein each home network of the plurality of home networks relates to a respective household.

In 201, one or more household related features are determined by feature engineering of the network traffic data, wherein the one or more household related features are related to one or more of: a device property, a security threat event and an application usage.

In 202, the one or more household related features are associated, in a database, with an identification data assigned to each household.

In 203, household clusters that represent groups of households comprising a predetermined number of common household related features are identified.

In 204, a targeted service is provided to a customer based on the household cluster associated with the household of the customer.

In an embodiment, the household in this context may include one or more persons using the same home network, one or several persons living in the same house or sharing the same local network, a single family or another group of people. In an embodiment, feature engineering is a process of using the network traffic data to extract features from the raw data and a household related feature may be an attribute or a property shared by all of the independent units on which analysis or prediction is to be done. Any attribute can be a household related feature if it is useful to the model.

In an embodiment, each household cluster is associated with a household persona identifier based on the household related features related to the representative households. The household persona identifier is descriptive of behavioural characteristics of the household cluster.

In an embodiment, the household persona may be defined as a distinct cluster of household related features that can be used to describe a representative number of households. The household persona has sufficient differentiation on features from other households belonging to other household personas.

In an embodiment, in response to detecting a new household, the new household is associated to a household cluster based on comparing the household related features of the new household with the household related features associated with the household clusters.

In an embodiment, the household clusters are identified by first generating a matrix structure, wherein one or more rows within the matrix structure represent households, one or more columns within the matrix structure represent household related features and each dot within a 2-dimensional scatter plot of a visualization of the matrix structure represents a separate household. Next, two or more dots within the 2-dimensional scatter plot of the visualization of the matrix structure that represent households comprising the predetermined number of common household related features are identified based on analysing distances between the dots.

In an embodiment, in response to detecting the distance between two dots of the two or more dots within the 2-dimensional scatter plot of the visualization of the matrix structure being below a predetermined threshold, the related households are determined to be part of a same household cluster that comprises the predetermined number of common household related features.

In an embodiment, one or more dots from the center of each household cluster is selected and each household cluster is associated with a household persona identifier based on the household related features related to the representative households of the selected one or more dots.

In an embodiment, in response to detecting a new household, the distance to the nearest household cluster is determined by comparing the dots of the 2-dimensional scatter plot of the visualization of the matrix structure with a dot representing the new household. In response to detecting the distance to the nearest household cluster being lower than a predetermined threshold, the new household is associated with the nearest household cluster.

In an embodiment, the nearest household cluster is selected by using a distance metric or inverse cosine similarity.

In an embodiment, the targeted service to the customer based on the household cluster associated with the household of the customer may comprise automatically providing a predetermined optimized service to the customer based on the associated household cluster after detecting a server request for the customer and after determining to which household cluster the customer is related to.

In an embodiment, the one or more household related features comprises one or more of: a device ID, a device model, a security threat related attribute, a fingerprint, a device intelligence data, an application usage data.

In an embodiment, further action may be taken to protect one or more home network and/or the one or more user devices based on the identified household clusters. The further action may comprise one or more of: reporting application usage time to the one or more user devices, reporting application usage statistics, controlling or blocking usage of the one or more applications, enforcing time limits to the one or more applications or application categories, preventing communication with the one or more applications, and applying other security measures to protect a local/home network and/or the one or more user devices.

In an embodiment, the method may be used for profiling households based on numerous feature associations of the households that could include: "family" personas, education, income level, purchasing behavior, size of family, types of personas in the household, number of devices/specific types of devices, identified job banding of persons/IT status/employer, employment status, remote worker, small business owner, identified home working status, frequent traveler, morning activity, midday activity. A household can be profiled based on its basic attributes and time dependent attributes, such as data from which it can be deduced whether the family is at home, on holiday or work, for example. Services to the household can be targeted and optimized based on the state of the household, such as whether at home/holiday or changes of state of the persona (home/away/remote working/at the office). Uses for classification of households into household clusters are also numerous such as: enabling service providers proposals to the household of what devices they might be lacking/planning to buy/needs renewing in the future ("looks like your device is old, we recommend changing to . . . ", next year's recommended IT shopping for the household: tv, mobile renewal, "other households with similar personas have these kind of gadgets (e.g. surveillance system . . . )"), various consumer service events, providing vulnerability data of devices, security recommendations, new technology recommendations, providing estimates on the amounts the household spends on streaming services or other application service subscriptions per year.

Thus, based on analysis of the network data, correct and timely support/service can be optimized for the households. Automatic solving of problems is also enabled. Having the knowledge of which type of household clusters the household belongs to, enables offering a customer experience that is tailored to the household personas specifically.

In an embodiment, the first large scale collection of raw data from the household devices is done only on non-private data or the collected data can be anonymized such that any personal data is processed in a way that the personal data can no longer be associated with a specific person without the use of additional information. Thus, only non-private and/or anonymised data may be used in an embodiment of the invention. For example, the data can be rendered down to a general level (aggregated) or converted into statistics to prevent identifying any individuals from them.

The number of household related features/attributes of the households are defined via feature engineering to determine, for example, the amount of different household devices, and compilated numbers (e.g., number of different IP addresses appearing in the traffic average per day) there may be. While the identified household clusters may represent groups of households comprising a predetermined number of common household related features, the household cluster categories can also be mixed, and a household could belong to multiple household clusters/categories. Data scientist or a machine learning model may determine compact enough household clusters and define actual household related features of the households for the respective household clusters and generate the household cluster identifier, such as a fantasy name for them.

New households are added to the system by comparing every available data such as fingerprints, data types, device ID data, DI (device intelligence) engine output, netflow daily activity, threats sent out, application usage of the devices. Model can be developed further, for example, to predict money spending, prices of devices, to calculate cost of a household infrastructure, and to estimate cost per dollars of an average US household currently running a specific household device infrastructure and how this is divided per area.

In an embodiment, also a time aspect related to device and/or application usage changing over time (daily, weekly, monthly, yearly) in the relevant households is taken into account by continuous retraining of the model. Thus, even for already categorized households, the data collection is repeated regularly to detect these types of time dependent changes in the behaviours of the households. Updated data is then used to retrain the models and/or assign the households into appropriate household clusters or new household persona identifiers when needed as the household personas may also change over time.

Personalization of services is becoming an important theme as internet service providers strive to enhance their product offerings and customer experiences. Personalization strategies are relevant for marketing, retention, customer service and customer experience, for example. The embodiments of the invention aid internet service providers with their personalization strategies as it will allow them to better understand the needs and competencies of their customers. Ultrafast speeds, unlimited data and whole home Wi-Fi coverage are becoming ubiquitous and require more automated solutions to enable more targeted services for the customers.

Customer service and customer experience can be improved with speed guarantees, connection guarantees and dedicated support from 'local' call centers. Embodiments of the present invention enable delivering enhanced customer experiences in an automated and cost-effective manner. This invention outlines solutions that are aimed at leveraging network data and artificial intelligence to solve several of these problems for internet service providers.

Figure 3:
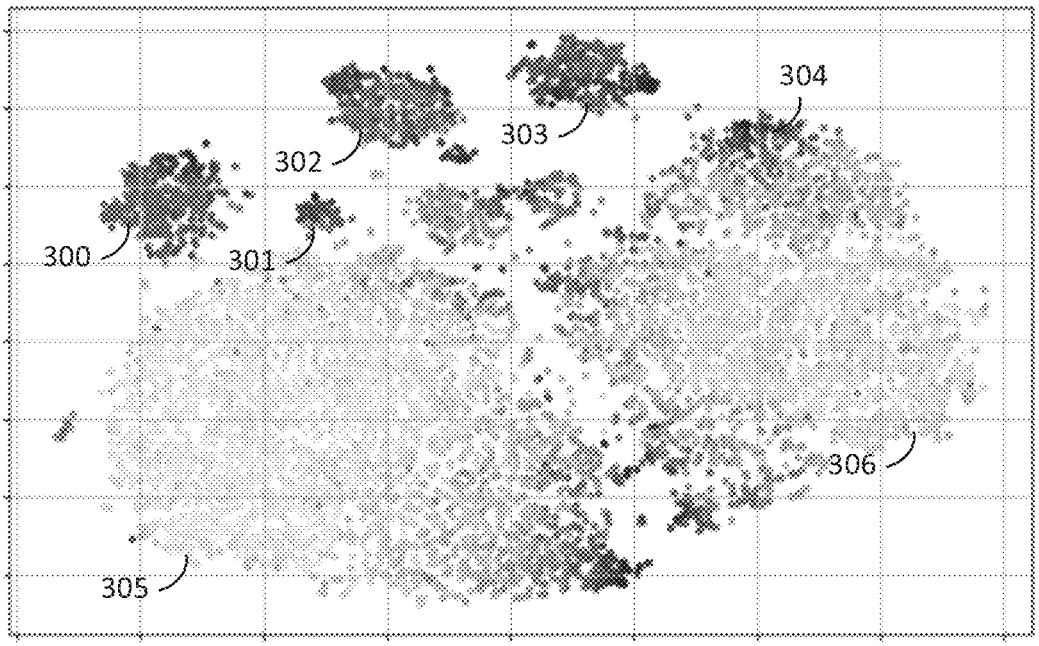
FIG. 3 is an example graph of a use case example, according to one embodiment.

FIG. 3 is an example graph visualization of a use case example.

In this example embodiment, after a large-scale collection of network traffic data, for example, across live deployment of a service cloud provider, the received raw data is prepared and a number of household related features are defined via feature engineering. In this use case example, the data is visualized to derive the household clusters.

In an embodiment, the input of the visualization is a matrix where rows correspond to households and the columns correspond to the household related features. In other words, each household is represented by an array of numbers. The output of the visualization is a 2-dimensional scatter plot, where each household is represented as a dot in the FIG. 3. If two households are close to each other in the figure, then they behave similarly since they have household related features in common. Household personas will appear as clusters 300-306 in the visualization. The applied visualization algorithm may use a principal component analysis (PCA), a t-distributed stochastic neighbour embedding (t-SNE) or an autoencoder or any other suitable method. PCA is typically used in exploratory data analysis and for making predictive models. t-SNE is a statistical method for visualizing high-dimensional data based on stochastic neighbour embedding. An autoencoder is a type of an artificial neural network that can be used to learn efficient data coding.

Household clusters can be identified in FIG. 3. example by identifying clustering of the dots or by calculating the distances between the dots, for example. In this example embodiment, a few representative households are selected from the center of each cluster. The household related features of the representative households are then analysed, and a household persona identifier is given to the clusters based on the analysis. The household persona identifier can be a fantasy name, such as "tech savvy", "early adopters", "practical user", "overwhelmed user", "indifferent user" or any other name that can be descriptive of the common behavioural characteristics of the households in the respective household cluster. Based on the household persona identifiers, a targeted service related to a customer can be enabled. For example, for a household that is associated with a household persona identifier associated with technology savvy behavioural characteristics, a different service may be offered than for a household that is associated with a household persona identifier associated with low technical competency behavioural characteristics.

In an embodiment, if a new household's household persona identifier should be determined, then the system may calculate the closest representative household based on the household related features associated with the household clusters. The calculation may be done by using a distance metric such as a Euclidean distance (the length of a line segment between two points that can be calculated from Cartesian coordinates of the points using the Pythagorean theorem) or inverse cosine similarity (a measure of similarity between two non-zero vectors of an inner product space), for example. Any other suitable process or a calculation method can also be used to derive the closest representative household to the new household.

In an embodiment, if a distance between the nearest/closest representative household of a household cluster is lower than a predetermined threshold, then the household persona identifier of this nearest/closest representative household can be used to characterize the new household as well.

Figure 4:
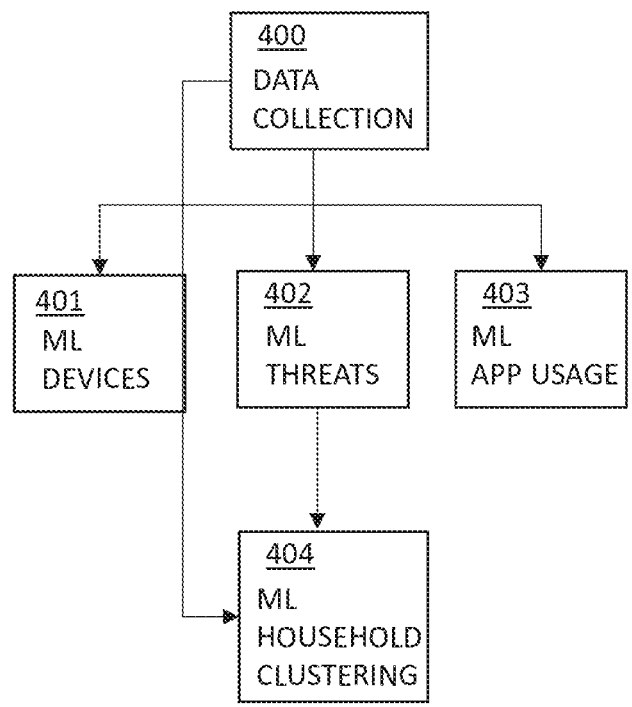
FIG. 4 is a block diagram of an example machine learning system, according to one embodiment.

FIG. 4 is a block diagram illustrating a machine learning system, according to one embodiment.

In an embodiment, the process comprises of three high level stages: data collection (400), generating machine learning model(s) (401, 402, 403) and a model for deriving the household persona identifiers associated to the household clusters (404).

At the service cloud, the collected network traffic data is processed and acted upon by various rules and machine learning models. For example, a model deriving household related features related to user devices (401) may be used to determine device properties such as types of devices, device models, device makes, device operation systems, device connections to gateways, active vs. inactive times of the device. A model deriving security threat events (402) may in turn be used to determine security related threats such as any suspicious inbound or outbound messages that are needed to be logged and blocked, for example. A model deriving application usage related to user device may be used to determine what applications are used on the devices and how long they are used, for example.

In an embodiment, a model deriving the household clusters and generating the household persona identifiers may act on the outputs of the analysis and assess which household cluster a household belongs to.

In an embodiment the devices and applications run in the devices in the home networks generate network traffic data by casual application usage which may be routed via a router. The network traffic description information (netflow) related to the generated network traffic data is then forwarded to the service cloud by the router. In an embodiment the devices may be connected to an internet provider's home gateway where a firmware agent of the service cloud may be used to inspect the network traffic and collect the pertinent markers across a range of protocols and to forward that data to the cloud.

In an embodiment, the collected data may be collected across the following protocols or any other appropriate protocols: Domain Name System (DNS) (DNS question packets), Multicast DNS (MDNS) packets for local device discovery including many IOT devices, Simple Service Discovery Protocol (SSDP) (broadcast packets (User Datagram Protocol (UDP)) including full Layer 7 payload for device discovery details), Dynamic Host Configuration Protocol (DHCP) (DHCP request parameters list options, DHCP client identifier, DHCP vendor identifier, DHCP hostname (packet types including DISCOVERY, OFFER, REQUEST, ACKNOWLEDGE), sample Transmission Control Protocol (TCP) "SYN" (TCPSYN) packets initiated from devices, TCP flags and parameters (window size, Managed Security Services (MSS), etc.) collected, Hypertext Transfer Protocol (HTTP) user-agent (UA), MAC (device MAC address), HTTP (Layer 7 payload for Hypertext Transfer Protocol Secure (HTTPS) request (TCP)), HTTP(s) Fetch (gather Layer 7 details about HTTP header and body for devices that expose a web administrative interface), Internet Control Message Protocol (ICMP) (capture of ICMP replies from active "ping" of devices (active scan)), Netflow (netflow data (srk IP, dst IP, sr PORT, dst PORT, etc.)).

The machine learning models may be used to translate the protocol raw data to an intelligible device related data, security threat events data and to application tracking data. In an embodiment, a trained machine learning model may be used to make predictions about future household behaviours of the household clusters based on all the collected data.

In an embodiment, the collected network traffic metadata may be transmitted via the local router but also sending directly via a network gateway is possible, for example when the device is not in the computer network. The collected application network traffic metadata may comprise following data but is not limited to it: an application name, an identification of the application, a version of the application, a network traffic protocol type (e.g. Transmission Control Protocol (TCP), Hypertext Transfer Protocol (HTTP), Hypertext Transfer Protocol Secure (HTTPS), User Datagram Protocol (UDP), Domain Name System (DNS), Multicast DNS (MDNS)), a timestamp of a connection, a connection target, a connection direction, number of transferred bytes to upstream and/or downstream, and a computer device identification running the dedicated software application.

Each local router of the plurality of home networks collects network traffic data from the home network and the data feeds from the local routers may be combined by matching metadata attributes and labeling the data based on device, threat and/or application information received.

The collected and processed data is used to create one or more machine learning models and/or rules to determine household clusters and determining household persona identifiers for the households based on the network traffic that is collected. The results may then be used to record and show, for example, household cluster specific application usage times, device specific behaviours and/or threat related behaviours and even to enforce application and/or application category specific time limits, to block any malicious applications, and/or to provide targeted services to customers, for example.

Figure 5:
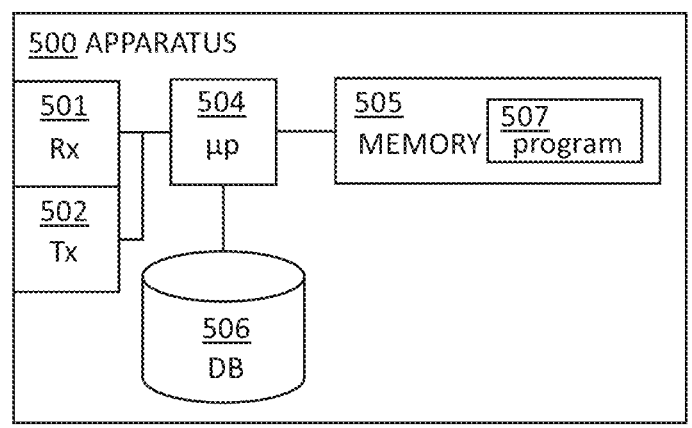
FIG. 5 is a block diagram of a computer apparatus, according to one embodiment.

FIG. 5 is a block diagram showing an example of a network apparatus that can implement the method according to an embodiment. A processor device 504 is provided that is configured to: receive network traffic data relating to one or more devices of a plurality of home networks, wherein each home network of the plurality of home networks relates to a household respectively; determine one or more household related features by feature engineering of the network traffic data, wherein the one or more household related features are related to one or more of: a device property, a security threat event and an application usage; associate, in a database, the one or more household related features with an identification data assigned to each household; identify household clusters that represent groups of households comprising a predetermined number of common household related features; and provide a targeted service to a customer based on the household cluster associated with the household of the customer.

In an embodiment, the processor device 504 is configured to store data such as any network-based identification data, metadata, attributes, values, addresses, hostnames as well as other data related to received network traffic data, any metadata, state information and/or domain data to the database 506. The database 506 is shown in this example as being located at the apparatus 500, but it will be appreciated that the apparatus 500 may alternatively access a remote database. The database 506 may comprise necessary data collected from user devices and/or plurality of local networks.

The apparatus 500 is provided with a receiver 501 that receives the collected network traffic metadata. A transmitter 502 is also provided for communication with a computer network, a router, a computer device and/or an outside server.

In the above description, the apparatus 500 is described as having different transmitter and receiver. It will be appreciated that these may be disposed in any suitable manner, for example in a single transmitter and receiver, a transceiver and so on. Similarly, a single processor 504 is described but it will be appreciated that the function of the processor may be performed by a single physical processor or by more than one processor.

The apparatus 500 is also provided with a non-transitory computer readable medium in the form of a memory 505. The memory may be used to store a computer program 507 which, when executed by the processor 504, causes the processor 504 to perform the functions described above. The computer program 507 may be provided from an external source. In an embodiment, at least some or even all the functions of the method can be implemented in any apparatus, for example any computer device or a server.

Figure 6:
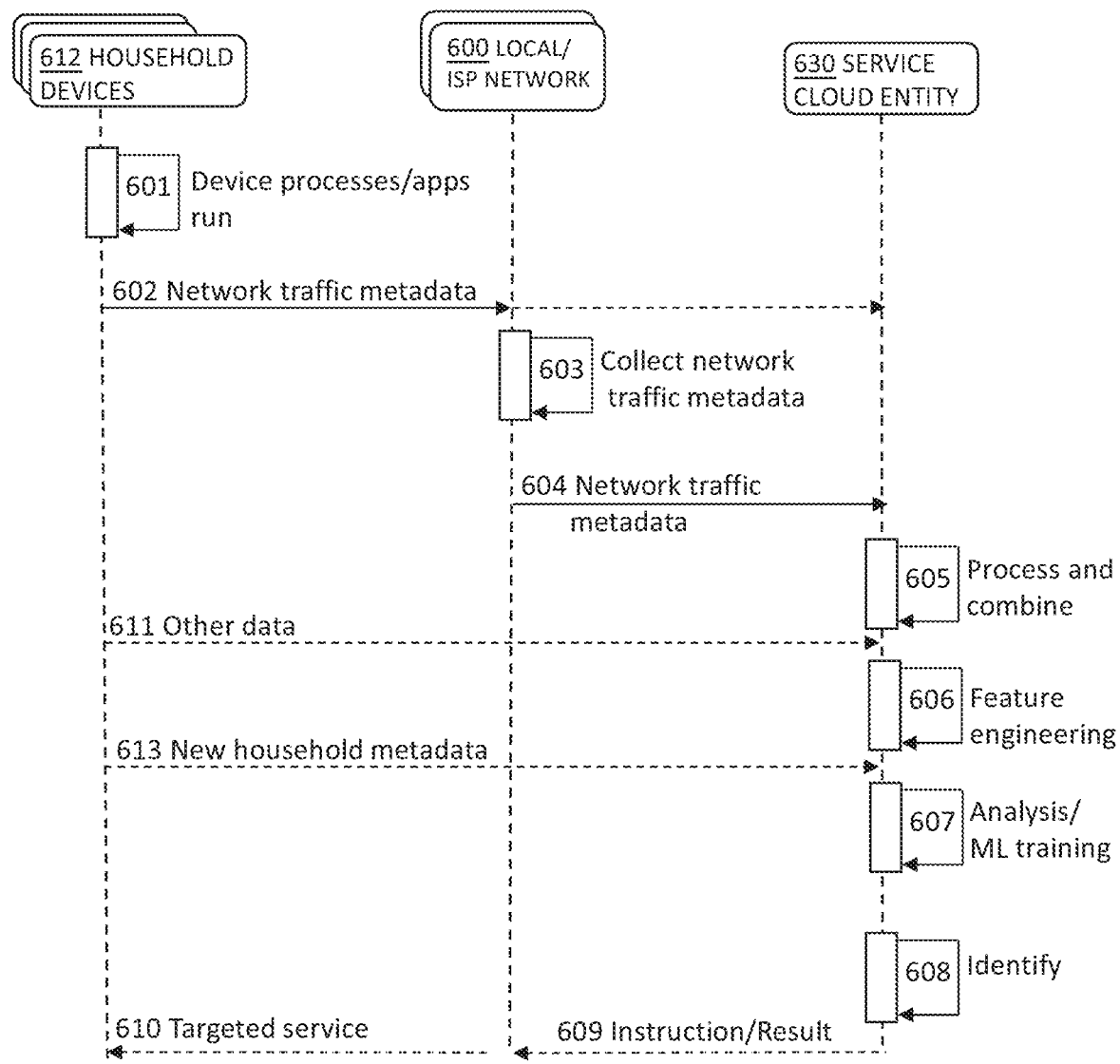
FIG. 6 illustrates a signal sequence diagram, according to one embodiment.

FIG. 6 a signal sequence diagram illustrating a process according to one embodiment.

The steps, signaling messages and related functions described in relation to FIG. 6 are in no absolute chronological order, and some of the steps may be performed simultaneously or in a different order.

In 601, household devices 612 of a plurality local/ISP serviced networks 600 generate network traffic metadata via device processes and applications that are run on the devices 612. In 602, the generated network traffic metadata from each of the household devices 612 is transmitted to the router/gateway of each respective local network 600. Each local network 600 collects the network traffic metadata generated by the household devices 612 in 603 and transmits the network traffic metadata to a service cloud entity 630 in 604. In some embodiments, it is also possible that the household devices 612 may directly send at least part of the data to the service cloud entity 630 (611).

In 605, the network traffic metadata received from the plurality of home networks 600 is processed and combined at the service cloud entity 630. In 606, one or more household related features are determined by feature engineering of the network traffic data. The household related features are associated in a database with an identification data assigned to each household. In 607, one or more machine learning models are created based on analysis of the data to identify household clusters that represent groups of households comprising a predetermined number of common household related features (608).

In 613, metadata related to devices associated with a new household is received and the continuously trained machine learning model is used to associate the new household to a household cluster based on comparing the household related features of the new household with the household related features associated with the household clusters.

Targeted service may be provided to a customer, such as the owner of a home network, based on the household cluster associated with the household of the customer. Based on the results from the machine learning model, further action can be taken to provide the targeted services to customers. In 609, instructions/information/results of the analysis for providing dedicated services to a home network is sent. The further action may comprise one or more of: offering dedicated support from local call centers/help desks/service chats/service websites, providing device or application specific solutions to the customers, and/or protecting one or more home networks and/or the one or more user devices, blocking a client application, enforcing time limits to a client application or application categories, preventing communication with the client application, applying other security measures (610).

For any personalization strategy to be successful, an internet service provider requires access to data which educates them on their customers. The solutions according to an embodiment will provide means of understanding the households by using network level data collected and processed on the home gateway and a private cloud. It will provide a means to classify each household to a persona classification which in turn can be mapped to household preferences.

Understanding which household persona a customer belongs to will allow tailoring the customer touchpoints. A touchpoint is "a point of contact or interaction," i.e., when customers ring the helpdesk, go to the website, or chat on eChat. Touchpoints are therefore an opportunity to impact the customers perception of the service positively or negatively.

As a use case example, the model may have one household persona identifier called "The Early Adopters". By leveraging this model, the model can predict if a caller or eChat user belongs to this "Early Adopters" household persona. This in turn allows the service provider to tailor the touchpoint and create the best possible outcome for both parties as they know that "Early Adopters" tend to be tech savvy with all the latest gadgets and applications.

Thus, an automated way for find a correct support for a customer and solving of problems based on the network traffic data is provided. Based on identifying household clusters and specific patterns in the network traffic data that are common to the household cluster, conclusions can be drawn as to what behaviours or characteristics are common to those households.

The steps, signaling messages and related functions described above in relation to the figures are in no absolute chronological order, and some of the steps may be performed simultaneously or in a different order. Other functions may also be executed between the steps and other signaling may be sent between the illustrated ones. Some of the steps can also be left out or replaced by a corresponding step. The system functions illustrate a procedure that may be implemented in one or more physical or logical entities.

The techniques described herein can be implemented by various means. An apparatus or system that implements one or more of the described functions may comprise not only existing means but also means for implementing one or more functions of a corresponding apparatus that is described with an embodiment. An apparatus or a system may also comprise separate means for each separate function. For example, the embodiments may be implemented in one or more modules of hardware or combinations thereof. For software, implementation can be through modules, for example such procedures and functions that perform the functions described. The software code may be stored in any suitable data storage medium that is readable by processors, computers, memory units or articles of manufacture, and may be executed by one or more processors or computers. The data storage medium or memory unit or database may be implemented within the processor or computer apparatus, or as an external part of the processor or computer apparatus.

The programming, such as executable code or instructions, electronic data, databases or other digital information may be stored into memories and can include a processor-usable medium embodied in any computer program product which can contain, store, or maintain programming, data or digital information for use by or in connection with an instruction execution system, such as the processor.

An embodiment provides a non-transitory computer-readable medium comprising stored program code comprised of computer-executable instructions. The computer program code comprises a code for receiving network traffic data relating to one or more devices of a plurality of home networks, wherein each home network of the plurality of home networks relates to a household respectively; a code for determining one or more household related features by feature engineering of the network traffic data, wherein the one or more household related features are related to one or more of: a device property, a security threat event and an application usage; a code for associating, in a database, the one or more household related features with an identification data assigned to each household; a code for identifying household clusters that represent groups of households comprising a predetermined number of common household related features; and a code for providing a targeted service to a customer based on the household cluster associated with the household of the customer.

Although the invention has been described in terms of preferred embodiments as set forth above, these embodiments are illustrative only and that the claims are not limited to those embodiments. Those skilled in the art will be able to make modifications and alternatives in view of the disclosure which are contemplated as falling within the scope of the appended claims. Each feature disclosed or illustrated in the present specification may be incorporated in the invention, whether alone or in any appropriate combination with any other feature disclosed or illustrated herein.

Those skilled in the art will recognize improvements and modifications to the preferred embodiments of the disclosure. All such improvements and modifications are considered within the scope of the concepts disclosed herein and the claims that follow.

What is claimed is:

1. A method comprising:
    generating, by a computing device comprising a processor device, a machine learning model by:
        receiving network traffic data relating to one or more devices of a plurality of home networks, wherein each home network of the plurality of home networks is associated with a different household of a plurality of households;
        determining, for each of the plurality of home networks, one or more household related features based on the network traffic data, wherein the one or more household related features are related to one or more of: a device property, a security threat event, and an application usage;
        generating a matrix structure comprising a plurality of rows and a plurality of columns, wherein each row corresponds to a different household of the plurality of households, and each column of the plurality of columns corresponds to a different household related feature of the one or more household related features;
        generating, based on the matrix structure, a scatter plot comprising a plurality of dots, wherein each dot corresponds to a different household of the plurality of households;
        identifying, based on a distance between dots of the scatter plot, a plurality of household clusters, each household cluster corresponding to a group of households that has common household related features, wherein, in response to detecting that a distance between two dots of the plurality of dots is below a predetermined threshold, determining that the households that correspond to the two dots are part of a same household cluster comprising the common household related features; and
        attributing, to each household cluster, a different household persona identifier of a plurality of household persona identifiers;
    subsequently receiving, by the computing device, first network traffic associated with a first home network that corresponds to a first household;
    determining, based on the machine learning model and the first network traffic associated with the first home network, a first household persona identifier of the plurality of household persona identifiers; and
    providing a targeted service to a computing device of the first home network based on the first household persona identifier.

2. The method according to claim 1, wherein each household persona identifier is descriptive of behavioural characteristics of a respective household cluster.

3. The method according to claim 1, further comprising:
    selecting one or more dots from a center of each household cluster; and
    associating each household cluster with a different household persona identifier based on the common household related features related to the households represented by the one or more dots.

4. The method according to claim 1, wherein determining, based on the machine learning model and the first network traffic associated with the first home network, the first household persona identifier of the plurality of household persona identifiers further comprises:
    determining, based on the household related features detected in the first network traffic, a location of a new dot in the scatter plot that corresponds to the first household;
    determining a distance to a nearest household cluster by comparing the new dot to locations of each household cluster of the plurality of household clusters; and
    in response to determining that the distance to the nearest household cluster is lower than a predetermined threshold, associating the first household with the nearest household cluster.

5. The method according to claim 4, wherein the nearest household cluster is selected by using a distance metric or inverse cosine similarity.

6. The method according to claim 1, wherein providing the targeted service to the computing device of the first home network based on the first household persona identifier comprises:
    in response to detecting a service request originating from the first household, determining to which household cluster the first household is associated and automatically providing a predetermined optimized service to the first household based on the associated household cluster.

7. The method according to claim 1, wherein the one or more household related features comprise one or more of: a device identifier (ID), a device model, a security threat related attribute, a fingerprint, device intelligence data, and application usage data.

8. An apparatus in a computer network system comprising: one or more processor devices and a non-transitory computer-readable medium comprising stored program code, the program code comprising computer-executable instructions that, when executed by the one or more processor devices cause the one or more processor devices to:
    generate a machine learning model by:
        receiving network traffic data relating to one or more devices of a plurality of home networks, wherein each home network of the plurality of home networks is associated with a different household of a plurality of households;
        determining, for each of the plurality of home networks, one or more household related features based on the network traffic data, wherein the one or more household related features are related to one or more of: a device property, a security threat event, and an application usage;
        generating a matrix structure comprising a plurality of rows and a plurality of columns, wherein each row corresponds to a different household of the plurality of households, and each column of the plurality of columns corresponds to a different household related feature of the one or more household related features;

generating, based on the matrix structure, a scatter plot comprising a plurality of dots, wherein each dot corresponds to a different household of the plurality of households;

identifying, based on a distance between dots of the scatter plot, a plurality of household clusters, each household cluster corresponding to a group of households that has common household related features, wherein, in response to detecting that a distance between two dots of the plurality of dots is below a predetermined threshold, determining that the households that correspond to the two dots are part of a same household cluster comprising the common household related features; and attributing, to each household cluster, a different household persona identifier of a plurality of household persona identifiers;

subsequently receive, by the computing device, first network traffic associated with a first home network that corresponds to a first household;

determine, based on the machine learning model and the first network traffic associated with the first home network, a first household persona identifier of the plurality of household persona identifiers; and provide a targeted service to a computing device of the first home network based on the first household persona identifier.

9. The apparatus according to claim 8, wherein each household persona identifier is descriptive of behavioural characteristics of a respective household cluster.

10. The apparatus according to claim 8, wherein the computer-executable instructions further cause the one or more processor devices to:
select one or more dots from a center of each household cluster; and
associate each household cluster with a different household persona identifier based on the common household related features related to the households represented by one or more dots.

11. The apparatus according to claim 8, wherein to determine, based on the machine learning model and the first network traffic associated with the first home network, the first household persona identifier of the plurality of household persona identifiers, the computer-executable instructions further cause the one or more processor devices to:
determine, based on the household related features detected in the first network traffic, a location of a new dot in the scatter plot that corresponds to the first household;
determine a distance to a nearest household cluster by comparing the new dot to locations of each household cluster of the plurality of household clusters; and
associate the first household with the nearest household cluster in response to determining that the distance to the nearest household cluster is lower than a predetermined threshold, wherein the nearest household cluster is selected by using a distance metric or inverse cosine similarity.

12. The apparatus according to claim 8, wherein, to provide the targeted service to the computing device of the first home network based on the first household persona identifier, the computer-executable instructions further cause the one or more processor devices to:
determine to which household cluster the first household is associated in response to detecting a service request originating from the first household; and
automatically provide a predetermined optimized service to the first household based on the associated household cluster.

13. The apparatus according to claim 8, wherein the one or more household related features comprise one or more of: a device identifier (ID), a device model, a security threat related attribute, a fingerprint, device intelligence data, and application usage data.

14. A non-transitory computer-readable medium comprising stored program code, the program code comprising computer-executable instructions that, when executed by a processor, cause the processor to:
generate a machine learning model by:
receiving network traffic data relating to one or more devices of a plurality of home networks, wherein each home network of the plurality of home networks is associated with a different household of a plurality of households;
determining, for each of the plurality of home networks, one or more household related features based on the network traffic data, wherein the one or more household related features are related to one or more of: a device property, a security threat event, and an application usage;
generating a matrix structure comprising a plurality of rows and a plurality of columns, wherein each row corresponds to a different household of the plurality of households, and each column of the plurality of columns corresponds to a different household related feature of the one or more household related features;
generating, based on the matrix structure, a scatter plot comprising a plurality of dots, wherein each dot corresponds to a different household of the plurality of households;
identifying, based on a distance between dots of the scatter plot, a plurality of household clusters, each household cluster corresponding to a group of households that has common household related features, wherein, in response to detecting that a distance between two dots of the plurality of dots is below a predetermined threshold, determining that the households that correspond to the two dots are part of a same household cluster comprising the common household related features; and
attributing, to each household cluster, a different household persona identifier of a plurality of household persona identifiers;
subsequently receive, by the computing device, first network traffic associated with a first home network that corresponds to a first household;
determine, based on the machine learning model and the first network traffic associated with the first home network, a first household persona identifier of the plurality of household persona identifiers; and
provide a targeted service to a computing device of the first home network based on the first household persona identifier.

* * * * *